March 13, 1951  F. A. SHULER  2,544,733
FILTERING MEDIA
Filed March 6, 1947  2 Sheets-Sheet 1

Inventor
Frederick A. Shuler
By W. S. McDowell
Attorney

March 13, 1951  F. A. SHULER  2,544,733
FILTERING MEDIA
Filed March 6, 1947  2 Sheets-Sheet 2

Inventor
Frederick A. Shuler
By W. S. McDowell
Attorney

Patented Mar. 13, 1951

2,544,733

UNITED STATES PATENT OFFICE 2,544,733

FILTERING MEDIA

Frederick A. Shuler, Columbus, Ohio

Application March 6, 1947, Serial No. 732,837

3 Claims. (Cl. 183—45)

This invention relates to filtering media, and more specifically to filter structures of the type adapted for the support of various air and gas purifying materials.

The use of activated charcoal, silica jel and alumina, in the purification of air and other gases has long been known to the air conditioning industry, but such materials as yet have been little utilized due to several distinctive disadvantages in the associated filter structure, or the supporting devices of the type embodying these materials.

One of the main objections to the use of a filter embodying odor-adsorbing material, is the added expense necessary in modifying present day air-circulating systems to incorporate the additional and advantageous feature of air purification through the removal of objectionable odors present in the gaseous constituents of air.

Another objection to the use of odor-adsorbing filters in an air re-circulating system, is the resistance offered to the flow of air by the filter structure itself, as well as the resistance encountered in the actual surface contact between the conditioning media and the gases passing therethrough. Such resistance tends to slow the circulation of air through the system and consequently decreases the volume capacity and efficiency thereof.

To provide for the efficient removal of odors from air, it is necessary that the odor adsorbing material presents a sufficiently large surface area to make complete contact with the volume of air to be conditioned thereby. To this end, it has been found that the materials in a granular state function most efficiently. However, to support such materials in a granular state, it is necessary to provide a framework whereby the material is prevented from being scattered or lost. Formerly, filter structures generally embodied perforated or screened retaining members to maintain the granular material in a substantially diffused state, and at the same time allow passage of air therethrough. It will be understood that the resistance to the flow of air or gases created by such perforated or screened members necessarily detracted from their use, due to the efficiency decrease of an air conditioning system employing filters of this general type.

It is, therefore, the general object of this invention to provide improved means for supporting filtering media in a substantially diffused state, whereby the same may be employed for use as a filtering agent in air conditioning apparatus.

It is another object of this invention to provide an air purifying filter embodying granular odor adsorbing material which is inexpensive in construction, and may be easily adapted for use in the ordinary air circulating system of a home or building without extensive modification of the previously installed unit.

It is another object of this invention to provide an odor removing filter or air circulating systems and devices which offer a minimum of resistance to the flow of air or gases therethrough.

A further object of the present invention is to provide a filter of this character wherein the granular adsorbing material may be regulated in concentration to satisfy the varying requirements of different air conditioning systems, regarding the concentration of objectionable gases, volume of air, and specified allowable resistance of the purifying filter to the air flow therethrough.

For a further and more complete understanding of the present invention, reference is made to the following description and the accompanying drawings, wherein.

Figure 1:
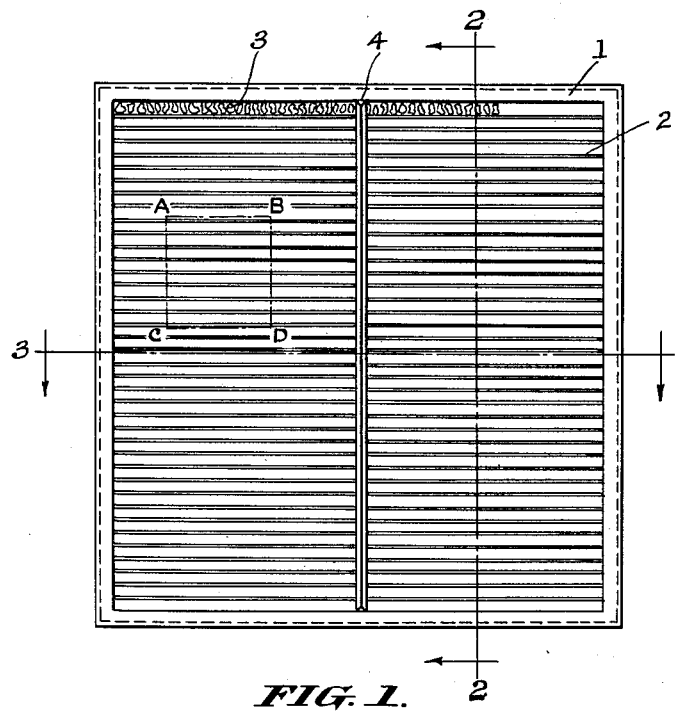
Fig. 1 is a front elevational view of an air conditioning filter formed in accordance with the present invention.
Figure 2:
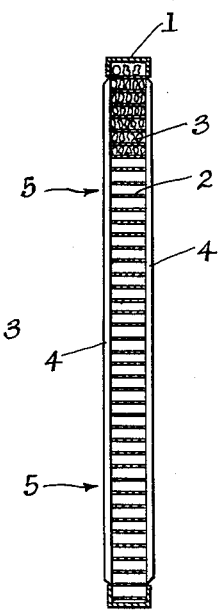
Fig. 2 is a vertical sectional view on a plane indicated by the line 2—2 of Fig. 1.
Figure 3:
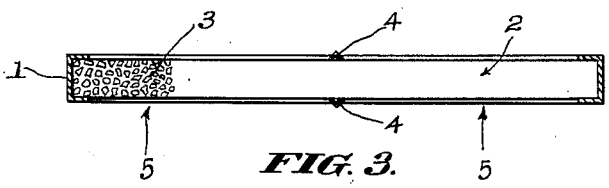
Fig. 3 is a horizontal sectional view taken along the line 3—3 of Fig. 1.

Referring to Figs. 1, 2 and 3 of the drawings, it will be noted that the filter disclosed therein makes use of a substantially rectangular outer frame 1 formed of a rigid lightweight material, wood or paperboard construction. The frame 1 forms an inwardly opening channel along its inner edges, which channel receives and adhesively supports the ends of a multiplicity of spaced transversely extending strips of adhesive tape 2. These strips are disposed perpendicularly to the major plane of the frame, and from a number of spaced passageways which extend through the thickness thereof. Preferably, these strips are formed from fabric or cellulose tape having applied on one or more sides a suitable adhesive, particularly of the synthetic cement type, such as neoprene, Pliolite, or other acrylic and vinyl ester resins, which retain their adhesive qualities under normal atmospheric conditions and under temperatures ranging to approximately 200° F. Each of the tape strips 2 adhesively hold numerous particles of granular activated charcoal 3 or other suitable adsorbing material, such as crystals of silica jel or activated alumina; the granules being of any suitable mesh size according to the desired ratio between maximum adsorbing surface and resistance to air flow. In this manner, the passageways formed by the strips of adhesive tape are impregnated with granules of adsorbing material which function to remove odorous qualities from air or gases passing therethrough.

Figure 4:
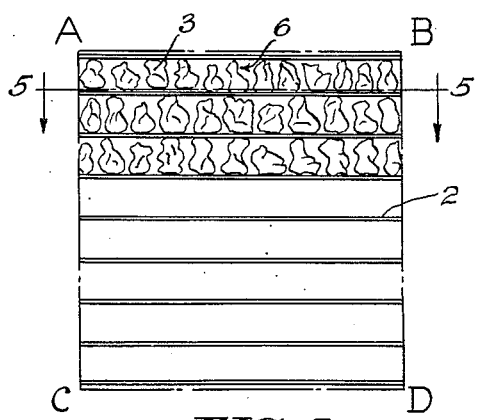
Fig. 4 is an enlarged fragmentary elevational view taken from the segment ABCD of Fig. 1.
Figure 5:
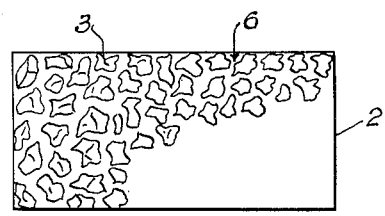
Fig. 5 is a horizontal sectional view along the line 5—5 of Fig. 4.

It will be understood, with reference to Figs. 4 and 5 of the drawings, that the size of the spacing of the granules carried by the tape will determine entirely the adsorbent concentration, as well as the resistance to air flow of the filter, these two factors being directly proportional to one another. Thus, if such a filter is to be used in a system placed, for example, in a chemical plant where the air is normally highly impregnated with undesirable odors, the granules will be relatively small and closely distributed upon the strip of tape to provide a maximum adsorbing surface, whereas if the system containing the filter is to be utilized in a theater or similar building where the air is relatively free of odorous qualities, the granules will be relatively large and widely distributed upon the strips to provide a minimum of resistance to the flow of air, which is indicated by the numeral 5, through the irregular channel 6 defined by the individual granules.

Where the size of the filter necessitates strengthening, stiffening rods or plates 4 are attached to the frame to extend transversely of the strips in order to support the mid-regions thereof.

Figure 6:
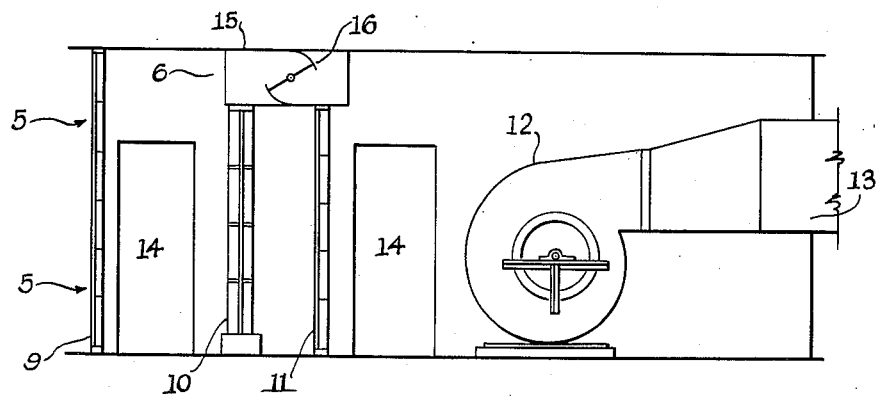
Fig. 6 is a diagrammatic view disclosing the present filter occupying a position of operation within a relatively large capacity central air conditioning system.

It will be manifest that the construction of filters of this type may be carried out in many shapes and sizes applicable to various air ducts and circulating systems, such as shown in Fig. 6 of the drawings, wherein a central air conditioning system having a dust filter 9 at its intake side receives air, indicated by the arrows 5, which passes through the dust filter and is heated or cooled, as desired, by coils 10, from whence it passes through the present odor adsorbing filter, indicated at 11, to a motor driven blower or fan 12 to be circulated through separate air ducts 13. Usually, systems of this character are provided with access doors 14 for the maintenance and servicing of the various filters and machinery. In such systems, a by-pass 15 having a controlling damper valve 16 may be utilized to avoid the coils 10 and the filter 11 when their use is not required.

Figure 7:
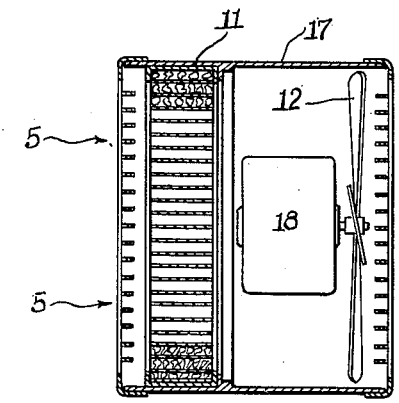
Fig. 7 is a longitudinal vertical sectional view taken through a portable air circulating device embodying a filter formed in accordance with this invention.

Fig. 7 discloses a small portable air purifying unit of either rectangular or circular configuration, utilized in relatively small areas, such as refrigerators, food cases, storage lockers, hospital rooms, rest rooms, etc., to eliminate unpleasant odors which permeate the air. This unit comprises an outer casing 17 which houses the present adsorbing filter 11 just inside of a perforated back wall through which air 5 is drawn under action of an air displacement fan 12 driven by a small electric motor 18, the purified air being discharged from the grilled front wall of the unit, as at 13.

In view of the foregoing, it will be seen that the present invention contemplates highly useful and efficient means for supporting granular or relatively finely divided filtering media, and is particularly adaptable for use as a deodorizing medium for air conditioning systems. This invention is further characterized by its simplicity of construction and its economy of manufacture.

I claim:

1. In a filter for removing odorous qualities from gases; a substantially rigid rectangular outer frame of relatively slight depth; a multiplicity of spaced substantially parallel flexible webs carried within said frame; and a plurality of layers of granular odor-adsorbing material carried between and substantially filling the spaces between said webs, the granules of odor-adsorbing material being adhesively united to adjacent surfaces of said webs to prevent relative displacement of said granules with respect to said webs.

2. In an air filter; a substantially flat rigid outer frame defining a fluid passage; a multiplicity of relatively closely spaced parallel webs supported by said outer frame and extending transversely of the air passage, said webs being provided with adhesive coatings upon their outer surfaces; and layers of granular odor-adsorbing material carried between adjacent webs and substantially filling the spacing therebetween, the individual granules of said layers being adhesively secured to said webs by the adhesive coating applied thereto.

3. An odor-adsorbing filter comprising an outer rectangular frame; a multiplicity of spaced parallel webs extending transversely of and encompassed by said frame, said webs being disposed along planes substantially normal to the plane of said frame and defining a plurality of open-ended air passageways; and a multiplicity of layers of granular odor-adsorbing material extending between said webs and substantially filling the spacing therebetween, the individual granules of each layer being adhesively joined with opposed surfaces of adjacent webs.

FREDERICK A. SHULER.

REFERENCES CITED

The following references are of record in the file of this patent:

UNITED STATES PATENTS

| Number | Name | Date |
|---|---|---|
| 1,646,404 | Herbert | Oct. 25, 1927 |
| 1,794,447 | Bothezat | Mar. 3, 1931 |
| 1,821,824 | Woodward | Sept. 1, 1931 |
| 1,898,027 | Winslow | Feb. 21, 1933 |
| 2,038,071 | Wilhelm | Apr. 21, 1936 |
| 2,159,121 | Alley | May 23, 1939 |
| 2,272,746 | Holm-Hansen | Feb. 10, 1942 |
| 2,323,160 | Stecher | June 29, 1943 |
| 2,389,435 | Karlstrom | Nov. 20, 1945 |

FOREIGN PATENTS

| Number | Country | Date |
|---|---|---|
| 215,781 | Germany | Oct. 16, 1941 |